United States Patent [19]

Kalina

[11] 4,289,429

[45] Sep. 15, 1981

[54] METHOD AND APPARATUS FOR CONVEYING MATERIAL IN PIPELINE CAPSULES

[76] Inventor: Alexander I. Kalina, 12439 Millbanks, Houston, Tex. 77031

[21] Appl. No.: 71,178

[22] Filed: Aug. 31, 1979

Related U.S. Application Data

[63] Continuation-in-part of Ser. No. 925,514, Jul. 17, 1978, abandoned.

[51] Int. Cl.³ .............................................. B65G 51/36
[52] U.S. Cl. ..................................... 406/105; 406/194
[58] Field of Search ................. 406/105, 84, 194, 195; 104/138 R, 155, 156

[56] References Cited

U.S. PATENT DOCUMENTS

| | | | |
|---|---|---|---|
| 3,285,670 | 11/1966 | Hubbard | 406/105 |
| 3,797,405 | 3/1974 | Carstens et al. | 406/105 |

FOREIGN PATENT DOCUMENTS

| | | | |
|---|---|---|---|
| 1379260 | 1/1975 | United Kingdom | 406/105 |

*Primary Examiner*—Jeffrey V. Nase
*Attorney, Agent, or Firm*—Arnold, White & Durkee

[57] ABSTRACT

A pipeline capsule transportation apparatus and method for transporting capsules in a continuous linked train, including an elongated pipeline having a plurality of sets of upstream and downstream pipeline locations, a plurality of energy transfer stations downstream of the various downstream pipeline locations, each transfer station comprising an elongated enclosure which surrounds a length of pipeline and is in fluid communication with the length of pipeline, the enclosure having an inner diameter larger than that of the pipeline, station pumps for withdrawing fluid from a downstream location of each station and pumping the fluid into an upstream location of each station to provide downstream fluid flow along the enclosure of each station for propelling capsules passing through the length of pipeline in such enclosure, and control pumps for controlling the velocity of fluids between each set of upstream and downstream pipeline locations during use for the pressure to be less at each upstream pipline location than at the next succeeding downstream location, and for the pressure at each downstream station location to be greater than the pressure at the preceding upstream pipeline location for such station.

16 Claims, 3 Drawing Figures

METHOD AND APPARATUS FOR CONVEYING MATERIAL IN PIPELINE CAPSULES

CROSS-REFERENCE TO RELATED APPLICATION

This application is a continuation-in-part application of my co-pending application, Ser. No. 925,514 filed July 17, 1978, which was subsequently abandoned.

BACKGROUND OF THE INVENTION

The present invention relates generally to material transportation. More particularly, the present invention relates to capsulate-type material conveying in a pipeline.

For many years it has been known that fluid could be efficiently transferred by the use of pipelines. A fluid would be introduced into one end of a pipeline, pressure would be applied by means of pumps or gravity and the fluid would flow along the length of the pipeline to a desired destination.

Solids may be transported by pipeline if the solids are first ground or crushed and then mixed with a suitable liquid to form a slurry. The slurry may be pumped through a pipeline, although the particles of solid within the slurry introduce additional problems in the apparatus required to pump and transport such material.

Most recently it has been discovered that there may be some energy efficiency in introducing the material to be transported into a capsule and then transporting the capsule through a pipeline. Systems exist whereby packaged or bulk material is introduced into wheeled capsules which are propelled through a pipeline by columns of air. Typically trains of, say, three or four capsules are formed and then transported through the pipeline by columns or "slugs" of air moving at or near atmospheric pressure.

Two-directional flow is achieved through the use of a closed-loop system. Such a system could, of course, form a circle, or the like, with several terminals. Alternatively, a double pipeline could be built between two primary terminals with one pipeline representing a forward path and the other representing a return path. At each terminal a bypass system may be utilized to prevent the flowing air or fluid from being interrupted at terminals or stations.

The speed and grade-climbing ability of capsules in such a system have been limited in the past by a variety of factors, including pump capacity. It is believed that with known systems, extraordinarily large pump volumes are required to achieve economically suitable speeds and carrying capacities of capsules in a pipeline. It is believed that the energy requirements to move suitable volumes at acceptable speeds result in the consumption of an economically unfeasible quantity of energy.

It is further believed that in systems which rely on a continuous downstream flow of gas in a pipeline to convey pipeline capsules, not only are large volumes of gas flow required, but also high gas flow rates to provide a sufficient driving force for driving capsules along the pipeline. However, such a high volume, high flow rate gas flow will be subject to substantial frictional losses along the length of the pipeline.

Because of the high losses, it is frequently necessary to boost the gas flow rate at spaced intervals along the pipeline. This is usually done by extracting a fraction of the gas flowing down the pipeline, substantially increasing the pressure of the extracted fraction, and then reintroducing it substantially axially into the pipeline.

Because only a fraction of the gas flowing along the pipeline is extracted and pressurized, substantial pressures are required to boost the gas flow rate in the pipeline sufficiently to continue conveying the capsules.

It is further believed that in such systems the energy transfer from the gas streams to capsules in the pipeline, is essentially in the form of kinetic energy which will have the effect of momentarily accelerating a capsule, followed by gradual deceleration as the gas flow rate along the pipeline decreases.

Therefore, it is an object of the present invention to provide novel method and apparatus for conveying material in pipeline capsules which minimizes the factors which limit the speed and capacity of pipeline systems in the prior art.

In accordance with one embodiment of the invention a method and apparatus for conveying solid or fluid material in a pipeline capsule includes a series of pumping stations positioned along the length of a capsule-carrying pipeline. The pipeline is filled with a continuous link of capsules. It is believed that the "slugs" of air which prior art arrangements utilized to separate small trains of capsules created an undersirable amount of turbulence which resulted in significant energy losses.

At each station the pipeline passes through an enlarged diameter energy transfer station, zone or enclosure with slots or the like being placed in the pipeline to place the pipeline in fluid communication with the interior of the enlarged diameter zone. Three manifolds are provided: one at an upstream location in the pipeline; a second, near the entrance of the large diameter zone; and a third near the exit of the large diameter zone.

A first pump or compressor is arranged to pump, say, air or other suitable fluid from the third manifold toward the second manifold. A second pump or compressor is arranged to pump air from the first manifold to the second manifold. The arrangement of pumps provides a region or zone of highest pressure in the entrance to the enlarged diameter zone, a zone of intermediate pressure near the exit of the enlarged diameter zone, and a region of yet lower pressure in the vicinity of the first manifold.

Further according to the invention there is provided a pipeline capsule transportation apparatus for transporting capsules in a continuous linked train, the apparatus comprising:

(a) an elongated pipeline having an upstream pipeline location and a downstream pipeline location, (b) an energy transfer station downstream of the downstream pipeline location, the transfer station comprising an elongated enclosure which is associated with a length of pipeline and is in fluid communication with the length of pipeline, the enclosure having a cross-sectional area larger than that of the pipeline, (c) station pump means for withdrawing fluid from a downstream location of the station and pumping the fluid into an upstream location of the station to provide downstream fluid flow along the enclosure for propelling capsules passing through the length of pipeline in the enclosure, and (d) control means for controlling the velocity of fluid between the upstream and downstream pipeline locations during use for the pressure to be less at the upstream pipeline location than at the downstream location, and for the pressure at the downstream station location to be greater than the pressure at the upstream pipeline location.

The enclosure may conveniently be in communication with the length of pipeline within the enclosure, substantially along the entire length of that length of pipeline.

In an embodiment of the invention the control means may comprise pipeline pump means to withdraw fluid from the upstream pipeline location.

The pipeline may conveniently comprise a plurality of successive sections, with each section comprising an elongated pipeline having pipeline pump means at an upstream location and having an energy transfer station downstream of a downstream pipeline location.

In an alternative embodiment of the invention the control means may comprise an expansion chamber extending between the upstream and downstream pipeline locations, the chamber being in communication with the pipeline and in communication with the enclosure of the energy transfer station.

It would be appreciated that, in this embodiment of the invention, the pipeline would have an elongated length of pipeline upstream of the upstream pipeline location.

In this embodiment of the invention the pipeline may again comprise a plurality of successive sections, with each section comprising a length of pipeline having an expansion chamber at a downstream location, and having an energy transfer station downstream of the expansion chamber and in communication therewith.

The pipeline may, for example, be in the form of an endless loop.

The invention further extends to a pipeline as described, including a continuous train of linked capsules in the pipeline.

Further in accordance with the invention, a method of transporting capsules along a elongated pipeline, includes the steps of displacing the capsules as a continuous linked train of capsules in the pipeline by controlling fluid velocity in the pipeline between an upstream pipeline location and a downstream pipeline location to maintain a pressure which is lower at the upstream location than at the downstream location, and by maintaining downstream of the downstream pipeline location a flow of fluid downstream in an enclosure which is associated with a length of the pipeline and is in fluid communication with the length of pipeline, the flow of fluid being maintained by withdrawing fluid from an exit region of the enclosure and pumping the fluid into an entrance region of the enclosure, and the flow of fluid being maintained to provide a pressure at the entrance region which is greater than the pressure at the exit region, and a pressure at the exit region which is greater than the pressure at the upstream pipeline location.

The fluid velocity between the upstream and downstream pipeline locations may again be controlled in the manner as hereinbefore described.

In an embodiment of the invention the method may include the steps of continuously feeding capsules into an inlet end of the pipeline, linking the capsules, and continuously discharging capsules from a downstream discharge location.

Examples of the more important features of this invention have thus been summarized rather broadly in order that the detailed description thereof that follows may be better understood, and in order that the contribution to the art may be better appreciated. There are, of course, additional features of the invention that will be described hereinafter and which will also form the subject of the claims appended hereto. Other features and advantages will become apparent with reference to the following description and accompanying drawings.

Figure 1:
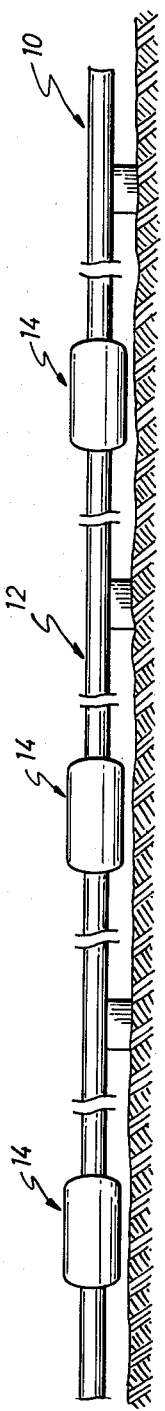
FIG. 1 is a schematic, fragmentary representation of one embodiment of a capsule pipeline system embodying the method and apparatus of the present invention.
Figure 2:
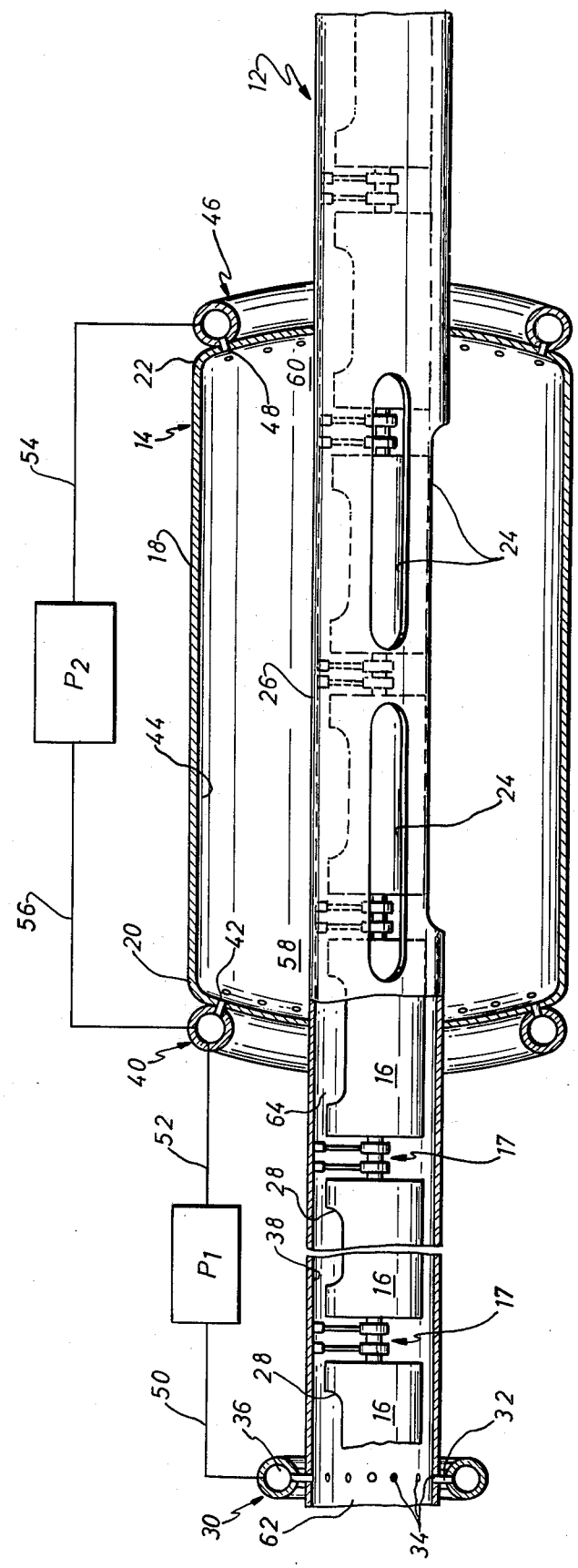
FIG. 2 is a partial sectional, fragmentary view of one embodiment of an energy transfer station according to the present invention.

With reference to FIGS. 1 and 2 of the drawings, reference number 10 refers generally to an apparatus for conveying material in pipeline capsules which includes a pipeline 12 of conventional design with energy transfer stations 14 incorporating the present invention positioned at intervals along the length of the pipeline 12. This pipeline 12 may, of course, represent only a small portion of a closed system or loop.

In any event, the present invention includes a continuous link of capsules 16 coupled end-to-end by conventional couplings 17 and which fill substantially an entire length of the pipeline 12. Unlike the prior art which utilizes trains of, say, three or four capsules separated by a slug or column of transporting fluid, the present invention contemplates a virtually endless train of capsules. This arrangement provides a significant reduction in resistance to movement previously caused by the turbulence in the "slugs" of air. That is, there is less energy loss in the length of a capsule than there is in the same length of an air or fluid column.

Of course, it will be appreciated that at loading and unloading stations, the continuous train of capsules may be broken into smaller units to facilitate handling. A system for removing short "subtrains" of the capsules from the pipeline for the purposes of loading and unloading and then reinserting such subtrains into the pipeline without interrupting the continuous flow of capsules has been made the subject of a copending application filed on July 17, 1978 under Ser. No. 925,512. This application was subsequently abandoned in favor of a continuation-in-part application which had been filed on Sept. 4, 1979 under Ser. No. 072,318, which continuation-in-part application matured into U.S. Pat. No. 4,234,271 granted Nov. 18, 1980.

In any event, each energy transfer station 14 includes an enlarged diameter portion or energy transfer chamber or enclosure 18. The chamber 18 may be fabricated from steel and is generally cylindrical or elongate in shape. An entrance end 20 and an exit end 22 are provided, and it will be appreciated that the chamber is sealingly attached to the exterior of the pipeline 12 by conventional means such as welding.

In preferred form the chamber 18 is coaxially arranged around the pipeline 12, and slots 24 are provided in that portion 26 of the pipeline 12 lying within the chamber 18 to provide fluid communication between the chamber and the interior of the pipeline 12. It will be appreciated that these slots 24 may have a variety of geometries and fall clearly within the scope of the invention.

The capsules 16 movable within the pipeline may be fashioned from a variety of materials including steel, plastic, fiberglass and the like, and each has an opening 28 facing generally upwards. The capsules 16 may be situated on wheels or tracks. Alternatively, the capsules 16 may be supported by a magnetic arrangement which forms the subject matter of another invention an application for which has been filed on July 17, 1978 under Ser. No. 925,513 and issued July 15, 1980 under U.S. Pat. No. 4,212,249. In any event, the slots 24 are arranged such that they will not interfere with the support or carriage mechanism for the capsules 16 as the capsules 16 pass through each energy transfer station 14.

A first manifold 30 is provided at a location on the pipeline 12 upstream from the chamber 18. The manifold 30 is preferably annular with a plurality of conduits 32 extending radially inwardly and in registry with a plurality of corresponding ports 34 in the pipeline 12. It will be appreciated that these conduits 32 place the interior 36 of the manifold in fluid communication with the interior 38 of the pipeline 12. In preferred form, the manifold 30 extends completely around the circumference of the pipeline with conduits positioned generally equi-angularly around the pipeline. However, other arrangements known to those skilled in this art may be suitable.

A second manifold 40 is provided adjacent the entrance end 20 of the chamber 18. As may be seen from the drawings, the second manifold 40 has a similar construction to that of the first manifold 30. That is, a series of conduits 42 are provided which communicate with the interior 44 of the chamber 18. The second manifold 40 is preferably located on a portion of the chamber 18 lying between the maximum diameter of the chamber and the maximum diameter of the pipeline. However, as will be appreciated, other arrangements might be suitable.

A third manifold 46 is provided at the exit end 22 of the chamber. This third manifold 46 similarly has conduits 48 which extend radially inwardly and communicate with the interior 44 of the chamber 18. The third manifold 46 is preferably positioned at a location between the maximum diameter of the chamber and the maximum diameter of the pipeline as shown in the drawings. However, other arrangements may certainly be suitable.

The first manifold 30 is connected by conventional means via a conduit 50 to a relatively small volume, high compression pump $P_1$. The manifold 30 is connected to the inlet of the small volume pump with the outlet of the small volume pump being connected by conventional means via a conduit 52 to the second manifold 40.

The third manifold 46 is connected by conventional means via a conduit 54 to the inlet of a large volume, small compression pump $P_2$. The outlet of the large volume pump is connected via a conduit 56 to the second manifold.

The volumes and compressions of the two pumps $P_1$ and $P_2$ are arranged such that when they are operating, three separate pressure zones are created. A relatively highest pressure zone 58 is created near the entrance end 20 of the chamber. An intermediate pressure zone 60 is created near the exit end 22 of the chamber. A relatively lowest pressure zone 62 is created in the vicinity of the first manifold 30. The pressures in the pressure zones 58, 60 and 62 may be controlled by conventional means, and streams of fluid are produced in an annular space 64 between the capsules 16 and the interior 38 of the pipeline and in the chamber 18.

In the chamber 18, the velocity of the air or other fluid being displaced by the pumps or compressors $P_1$ and $P_2$ exceeds the velocity of the capsules by a factor of at least two. That is, the air in the chamber 18 has at least twice the velocity of the capsules. It should be noted that the air introduced by the second manifold and air flow as a result of withdrawal by the third manifold is directed generally in the same direction as the direction of travel of the capsules. However, the air flow within the pipeline as a result of withdrawal by the first manifold 30 is directed generally opposite the direction of travel of the capsules.

With the arrangement of the present invention, capsules entering the energy transfer chamber receive an increase in potential energy with the result that the continuous train of capsules may be "pulled along" at each station. Energy is transferred from the fluid in the chamber 18 to the capsules 16 through the slots 24. With the present arrangement, the capsules generate less friction than an equivalent volume of fluid. That is, only the annular hydrodynamic friction between the capsule and the annular gas is significant. The friction between the annular gas and the interior of the pipeline is reduced with the present arrangement. With the present arrangement, there is eliminated the energy losses which occur by virtue of turbulent flow of gases in the slugs employed in prior art devices to transfer capsules in a pipeline. Whereas two percent of the total pipeline volume was occupied by a useful load in the prior art devices, embodiments of the present invention can facilitate useful loads in the order of 75 to 80% of total pipeline volume.

It is believed that with the apparatus of the present invention, capsules may be accelerated to velocities whereat, for a contiguous train of capsules, progressively lesser amounts of energy are required for further unit increases in velocity.

Figure 3:
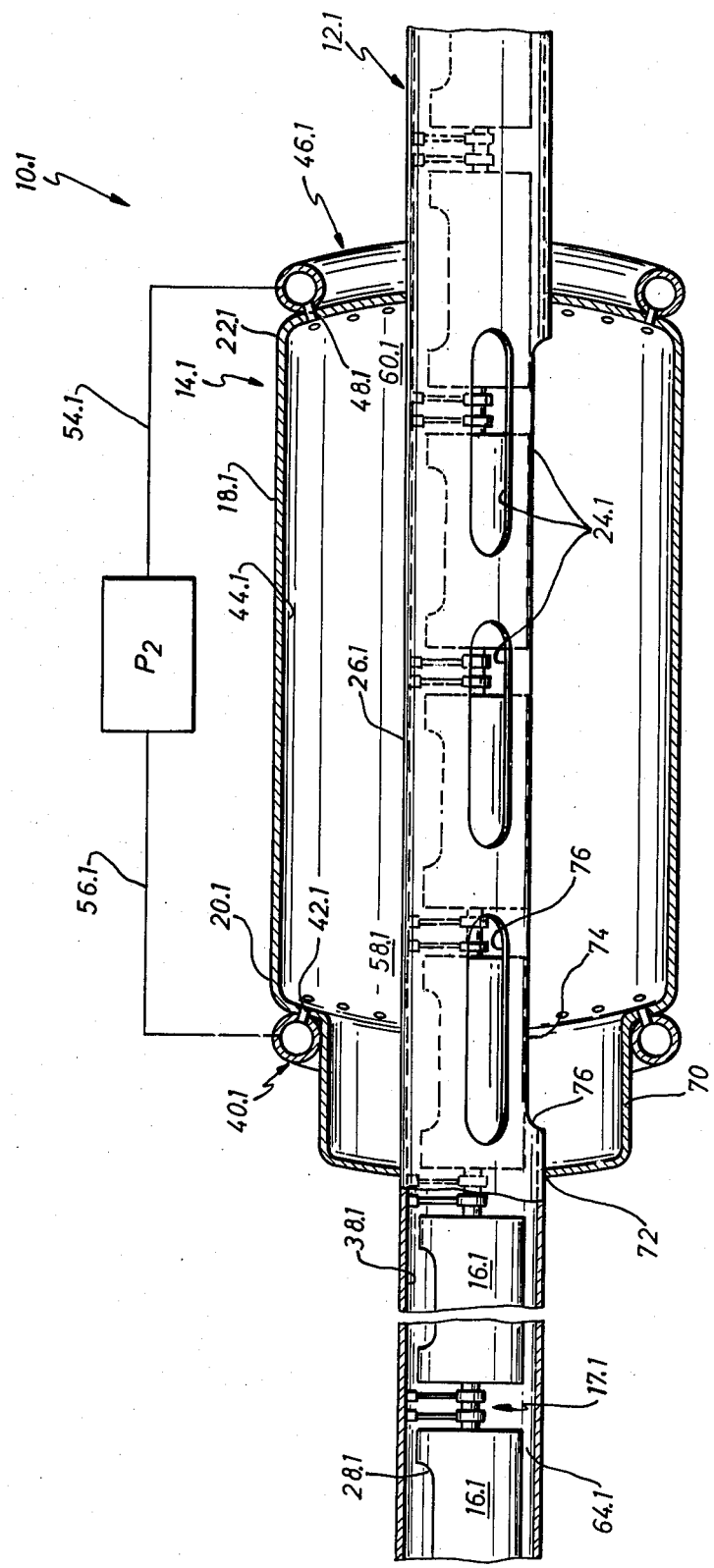
FIG. 3 is a partial sectional, fragmentary view of an alternative embodiment of a pipeline capsule transportation apparatus.

With reference to FIG. 3 of the drawings, reference 10.1 refers generally to an alternative embodiment of a pipeline capsule transportation apparatus in accordance with this invention.

The apparatus 10.1 corresponds generally with the apparatus 10 of FIGS. 1 and 2 and corresponding parts are indicated by correspondence numerals except that the suffix ".1" has been added to the reference numerals for FIG. 3.

The apparatus 10.1 differs from the apparatus 10 in that it does not include a manifold corresponding to the first manifold 30 of the apparatus 10, nor does it include a pump corresponding to the pump $P_1$ of the apparatus 10.

The apparatus 10.1 includes an alternative form of control means to achieve substantially the same objective of the apparatus 10.

The apparatus 10.1 includes control means comprising an expansion chamber 70 extending between an upstream pipeline location 72 and a downstream pipeline location 74.

The expansion chamber 70 is in communication with the section of the pipeline 12.1 enclosed by the chamber 70 by that section of pipeline 12.1 having slots 76 which correspond to the slots 24.1.

The expansion chamber 70 is further in communication with the interior 44.1 of the enclosure 18.1.

In use a fraction of the air or other fluid being circulated through one enclosure 18.1 of an energy transfer station 14.1 will move downstream of that energy transfer station with the capsules 16.1 in the annular space 64.1 between the capsules 16.1 and the interior 38.1 of the pipeline.

The pressure in that gas flow will gradually decrease until the fluid reaches the upstream pipeline location 72 on the upstream side of the next succeeding energy transfer station 14.1. Thereafter, in the expansion chamber 70, the gas will expand and its pressure can reach the pressure in the highest pressure zone 58.1 of the enclosure 18.1 without such increase in pressure interfering significantly with the continued downstream movement of the capsules 16.1.

Thereafter the operation of the apparatus 10.1 will be the same as the apparatus 10 in that, in the enclosure 18.1, the capsules 16.1 passing through the enclose 18.1 will receive an increase in potential energy with the result that the continuous train link capsules will be pulled along by such capsules.

In the apparatus 10.1 the effective length of pipeline between each expansion chamber 70 and each upstream preceding energy transfer station 14.1, and the effective length of each expansion chamber 70, are controlled so that the decrease in pressure along each such effective length of pipeline in the downstream gas flow in the annular space 64.1 between the capsules 16.1 and the interior 38.1 of the pipeline, resulting in an increase of capsule kinetic energy but a decrease in capsule potential energy, is at least offset by the increase in capsule potential energy and the corresponding decrease in capsule kinetic energy resulting from the increase in gas pressure in the expansion chamber 70.

The same objective is achieved in the apparatus 10 of FIGS. 1 and 2 by withdrawing fluid by means of the pump $P_1$ at the first manifold 30 at the upstream location of the pipeline 12, thereby providing for a flow of fluid in the annular space 64 between successive energy transfer stations 14 which is: (a) a net upstream flow; (b) a flow where the upstream component is balanced against the downstream component generated by the capsules 16 moving along the pipeline 12; or (c) a net downstream flow where the velocity of fluid in the annular space 64 is less than Factor X times the velocity of the capsules.

$$\text{Factor } X = \frac{\sqrt{k}}{1 + \sqrt{k} \cdot \frac{\sqrt{\lambda c}}{\sqrt{\lambda p}}}$$

where $\lambda c$ = coefficient of priction of capsule
$\lambda p$ = coefficient of friction of pipeline
k = (diameter of capsule)/(diameter of pipeline)

This arrangement ensures that the pressure at the upstream location of the pipeline will be less than pressure at the downstream location of the pipeline immediately upstream of each energy transfer station and that the capsules will have their potential energy increased along the pipeline without undue changes in kinetic energy which would lead to undesired acceleration or deceleration.

The embodiments of the invention as illustrated in the drawings provide the advantage that since the enclosures 18 and 18.1 of the energy transfer stations 14 and 14.1 have a substantially larger inner diameter than the inner diameter of the pipeline 12 or 12.1, a relatively large volume of fluid can be circulated through the enclosures 18 and 18.1 to impart potential energy to capsules 16 or 16.1 passing therethrough.

This relatively large volume of fluid can impart sufficient potential energy to the capsules even where relatively moderate pressures are provided at the highest pressure zones 58 or 58.1.

The energy transfer stations 14 and 14.1 provide the further advantage that because of their relatively larger innerdiameters the losses resulting from frictional effects along the length of the enclosures 18 and 18.1 are reduced thereby providing for more effective utilization of the energy provided by the gas circulating through the transfer stations and providing for effective energy transfer.

It will further be appreciated that the potential energy transferred to the capsules within the transfer stations 14 and 14.1 can be adjusted by adjusting the cross-sectional areas of the enclosures 18 or 18.1. Thus, to increase the potential energy transferred to capsules, the cross-sectional areas of the enclosures can be increased thereby providing a larger volume of gas flow to transfer energy to the capsules, rather than resorting to the more expensive and less efficient alternative of increasing the pressures provided at the highest pressure zones 58 and 58.1.

Applicant believes that the embodiments of the invention as illustrated in the drawings, can provide the advantage that energy is used more efficiently, that the velocity and load carrying capacities can be increased and that substantial advantages in economics can be provided in relation to known systems which rely on downstream gas flow along the length of a pipeline to convey individual capsules or relatively short groups of capsules, and which rely on boosters at periodic intervals to extract fractions of fluid flowing down a pipeline to boost such fractions thereby maintaining a required flow rate.

The foregoing description of the invention has been directed to particular embodiments in accordance with the requirements of the patent laws and for the purposes of explanation and illustration. It will be apparent, however, to those skilled in this art that many modifications and changes in both apparatus and method may be made without departing from the scope and spirit of the invention. For example, other manifold arrangements may be utilized to create the pressure differentials and fluid flow which have been found to efficiently impart energy transfer to the capsules moving in the pipeline. Moreover, rather than align the chamber coaxially with the pipeline, an eccentric arrangement may be desirable. It will be further apparent that the invention may also be utilized, with suitable modifications within the state of the art, to transport personnel. Such modifications of the invention will be apparent to those skilled in this art. It is applicant's intention in the following claims to cover all such equivalent modifications and variations which fall within the true spirit and scope of the invention.

What is claimed is:

1. Apparatus for transporting a capsule in a pipeline comprising:
   a length of pipeline having a first downstream location and a first upstream location and having a first inner diameter;
   an elongate enclosure having a second downstream location and a second upstream location and having a second inner diameter; said pipeline and said enclosure being arranged with said enclosure generally surrounding said pipeline;

first pump means for pumping fluid from said first upstream location to said second upstream location;

second pump means for pumping fluid from said second downstream location to said second upstream location; and fluid communication means for placing said pipeline and said enclosure in fluid communication.

2. The apparatus of claim 1 wherein said first pump means comprises a relatively small volume, large compression pump and said second pump means comprises a relatively large volume, small compression pump.

3. The apparatus of claim 1 wherein said fluid communication means comprises a longitudinal slot in said pipeline.

4. Apparatus for transporting a container in a pipeline comprising:

a length of relatively small diameter pipeline having a small diameter upstream location and a small diameter downstream location;

a length of relatively large diameter pipeline having a large diameter upstream and a large diameter downstream location;

said relatively large diameter pipeline having a length less than said relatively small diameter pipeline, said relatively large and small pipelines being sealed together;

fluid communication means for placing said relatively small and large diameter pipelines in fluid communication;

first pump means in fluid communication with said small diameter upstream location for creating thereat a zone of relatively low fluid pressure;

second pump means in fluid communication with said large diameter downstream location for creating thereat a zone of relatively intermediate fluid pressure; and said first and said second pump means being cooperable and in fluid communication with said large diameter upstream location for creating thereat a zone of relatively high fluid pressure.

5. A method of transporting an elongated link of capsules in a pipeline comprising the steps of:

creating at an upstream pipeline location a zone of relatively low pressure by exhausting fluid from the pipeline for fluid in the pipeline during use to increase in pressure to a downstream pipeline location remote from the upstream location;

creating in an entrance end of a co-axial elongate enclosure in fluid communication with the pipeline and at the downstream location in the pipeline a zone of relatively high pressure; and creating in an exit end of the enclosure a zone of relatively intermediate pressure for the pressure drop across the elongate enclosure to impart potential energy to capsules passing through the elongated enclosure to transport the link of capsules through the pipeline.

6. A method of transporting capsules in a pipeline comprising the steps of:

providing a contiguous link of capsules along substantially an entire length of a pipeline;

sealingly enclosing a relatively short length of the pipeline at a downstream location with an elongate enclosure sealed to the pipeline;

communicating an interior of the pipeline with the interior of the enclosure;

creating at an upstream pipeline location upstream from and remote from the enclosure a zone of relatively low pressure by exhausting fluid from the pipeline for pressure along the pipeline from the upstream location to the downstream location to increase during use;

creating in an entrance end of the enclosure a zone of relatively high pressure; and creating in an exit end of the enclosure a zone of relatively intermediate pressure.

7. A method according to claim 5 or 6, in which fluid is exhausted from the pipeline to create the zone of relatively low pressure at the upstream pipeline location by pumping fluid from the pipeline at the upstream pipeline location.

8. A pipeline capsule transportation apparatus for transporting capsules in a linked train, the apparatus comprising;

(a) an elongated pipeline having an upstream pipeline location and a downstream pipeline location remote from the upstream location;

(b) an energy transfer station downstream of the downstream pipeline location, the transfer station comprising an elongated enclosure which is associated with a length of pipeline and is in fluid communication with the length of the pipeline, the enclosure having a cross-sectional area larger than that of the pipeline;

(c) station pump means for withdrawing fluid from a downstream location of the station and pumping the fluid into an upstream location of the station to provide downstream fluid flow along the enclosure for propelling capsules passing through the length of pipeline in the enclosure; and (d) control means for controlling the velocity of fluid between the upstream and downstream pipeline locations during use by exhausting fluid from the pipeline for the pressure to be less at the upstream pipeline location than at the downstream pipeline location, and for the pressure to increase in the pipeline from the upstream pipeline location to the downstream pipeline location.

9. An apparatus according to claim 8, in which the control means comprises pipeline pump means to withdraw fluid from the upstream pipeline location.

10. An apparatus according to claim 9, in which the pipeline comprises a plurality of successive sections, with each section comprising an elongated pipeline having pipeline pump means at an upstream location and having an energy transfer station downstream of a downstream pipeline location.

11. An apparatus according to any one of claims 8 to 10, including a an elongated train of linked capsules in the pipeline.

12. A method of transporting capsules along an elongated pipeline, which includes the steps of displacing the capsules as an elongated linked train of capsules in the pipeline by controlling fluid velocity in the pipeline between an upstream pipeline location and a downstream pipeline location which is remote from the upstream pipeline location, by exhausting fluid from the pipeline to maintain a pressure which is lower at the upstream location than at the downstream location, and by maintaining downstream of the downstream pipeline location a flow of fluid downstream in an enclosure which is associated with a length of the pipeline and is in fluid communication with the length of pipeline, the flow of fluid being maintained by withdrawing fluid from an exit region of the enclosure and pumping the fluid into an entrance region of the enclosure, and the flow of fluid being maintained to provide a pressure at the entrance region which is greater than the pressure at the exit region, and a pressure at the exit region which is greater than the pressure at the upstream pipeline location.

13. A method according to claim 12, in which the fluid velocity between the upstream and downstream pipeline locations is controlled by pumping fluid from the pipeline at the upstream pipeline location.

14. A pipeline capsule transportation apparatus for transporting capsules in a linked train, the apparatus comprising;
   (a) an elongated pipeline having an upstream pipeline location and a downstream pipeline location;
   (b) an energy transfer station downstream of the downstream pipeline location, the transfer station comprising an elongated enclosure which is associated with a length of pipeline and is in fluid communication with the length of the pipeline, the enclosure having a cross-sectional area larger than that of the pipeline;
   (c) station pump means for withdrawing fluid from a downstream location of the station and pumping the fluid into an upstream location of the station to provide downstream fluid flow along the enclosure for propelling capsules passing through the length of pipeline in the enclosure; and
   (d) control means for controlling the velocity of fluid between the upstream and downstream pipeline locations during use for the pressure to be less at the upstream pipeline location than at the downstream pipeline location, and for the pressure to increase in the pipeline from the upstream pipeline location to the downstream pipeline location the control means comprising an expansion chamber extending between the upstream and downstream pipeline locations, the chamber being in communication with the pipeline and in communication with the enclosure of the energy transfer station.

15. An apparatus according to claim 14, in which the pipeline comprises a plurality of successive sections, with each section comprising a length of pipeline having an expansion chamber at a downstream location, and having an energy transfer station downstream of the expansion chamber and in communication therewith.

16. A method of transporting capsules along an elongated pipeline, which includes the steps of displacing the capsules as a linked train of capsules in the pipeline by controlling fluid velocity in the pipeline between an upstream pipeline location and a downstream pipeline location to maintain a pressure which is lower at the upstream location than at the downstream location, and by maintaining downstream of the downstream pipeline location a flow of fluid downstream in an enclosure which is associated with a length of the pipeline and is in fluid communication with the length of the pipeline, the flow of fluid being maintained by withdrawing fluid from an exit region of the enclosure and pumping the fluid into an entrance region of the enclosure, and the flow of fluid being maintained to provide a pressure at the entrance region which is greater than the pressure at the exit region, and a pressure at the exit region which is greater than the pressure at the upstream pipeline location; and the fluid velocity between the upstream and downstream pipeline locations being controlled by allowing the fluid in the pipeline to expand into an expansion chamber between the upstream and downstream pipeline locations, the expansion chamber being in communication with the enclosure.

* * * * *